United States Patent Office 3,367,418
Patented Feb. 6, 1968

3,367,418
WATER FLOODING METHOD
Willis G. Routson, Walnut Creek, Calif., assignor to The Dow Chemical Company, Midland, Mich., a corporation of Delaware
No Drawing. Filed Apr. 22, 1965, Ser. No. 450,166
4 Claims. (Cl. 166—9)

ABSTRACT OF THE DISCLOSURE

An improved method for secondary oil recovery by water-flooding involves the conjoint use of an acrylic amide polymer and ammonium hydroxide as additives to the injection fluid. Good mobility control and improved recovery of residual oil are achieved.

---

The present invention concerns an improved secondary oil recovery process. More particularly, the invention concerns the utilization of an aqueous solution of a mobility controlling polymeric additive and ammonium hydroxide as the driving fluid in the secondary recovery of oil by flooding.

It is known that the addition of alkaline reagents to water drives may enhance the recovery of oil. Moreover, in a recent patent (U.S. Patent 3,101,781) hot water or steam is utilized with a water-soluble, alkalizing agent, examples of which include ammonium hydroxide.

It would be desirable and it is an object of the invention to provide an improved method for the secondary recovery of oil. More particularly, it is an object of the invention to provide an improved water flooding process in which both mobility control of the flooding medium and enhanced displacement of residual oil are achieved. "Residual oil" is defined herein as that oil which remains in a unit volume of the oil-bearing formation after continued flooding of that unit volume with brine will produce no more oil. These objects, and other benefits as will be apparent hereinafter, are accomplished in accordance with the discovery of the present invention.

It has now been discovered that a water-flooding medium containing at least about 1% by weight ammonium hydroxide and a certain polymer mobility control agent decreases, to an unexpected degree, the amount of residual oil remaining in the flooded formation.

The mobility control additive useful herein is of the class of water-soluble, essentially linear, high molecular weight acrylic amide polymers.

Although the prior art teaches adding such polymers to water drives as mobility control agents, the intended function and benefits generally realized pertain to improved areal and vertical sweep efficiencies. The total oil recovery from a given portion of the formation through which the flood front passes, however, is not effectively increased over that achieved with ordinary water drives in which the driving medium is simply an aqueous brine. In other words, although the mobile oil may be recovered more efficiently using polymer modified flooding media, a brine or simple water flood, if continued long enough, would produce the same amount of oil. That is, the residual oil is the same in both cases.

Although water drives of increased pH have been taught to be effective for partial recovery of residual oil, the improvement achieved in accordance with the instant invention is substantially greater than would be expected when using the ammonium hydroxide alone. Since the mobility controlling, acrylic amide polymer is essentially inactive in reducing residual oil, the polymeric additive may be considered to have an activation effect for the aqueous ammonium hydroxide. Consequently, the process of the invention provides a water drive which not only accomplishes secondary recovery of oil with improved areal and vertical sweep efficiencies but also substantially and unexpectedly reduces the residual oil.

In a specific embodiment of the invention, a modified water-flooding medium is prepared for injection into an oil-bearing formation by dissolving in brine, or other aqueous flooding medium base, about 0.05% by weight of a high molecular weight polyacrylamide in which about 25% of the initially available acrylamide groups have been hydrolyzed to sodium carboxylate groups. As little as about 0.01% up to as much as about 0.5% by weight, based on the weight of the solution, of the polymeric additive can be used effectively.

The ammonium hydroxide is incorporated into the water-flooding medium at any stage in its formation. Preferably, it is added after addition of the polymeric, mobility control agent. To accomplish this, anhydrous ammonia can be metered to the polymer solution as it is injected into the ground. The anhydrous ammonia is supplied to the flooding medium under adequate pressure to insure dissolution of sufficient ammonia to form at least about 1% and up to as much as 50% by weight or more of ammonium hydroxide in solution. Usually, best results are achieved by incorporating from about 4 up to about 30% by weight, based on the weight of the solution, of ammonium hydroxide into the modified water-flooding medium. The more that is added within these limits, increases the recovery of residual oil.

Injection of the modified flooding medium, i.e., ammoniated-polymer aqueous solution, into an oil-bearing formation is then carried out according to known procedures. At least about 1% of a pore volume of the flooding medium is injected after which one or more of the flood additives, i.e., polymer and ammonia, can be discontinued if desired. Usually no more than about 30% of a pore volume need be injected to realize the substantial advantages of the invention. Upon discontinuing injection of the improved flooding medium, the previously injected slug is driven on into the formation by further injections of other fluid driving media such as water, organic fluids or gases. In any event, sufficient pressure is maintained on the ammoniated-polymer containing flood front through injection wells penetrating the oil bearing formation to force it through the formation and thereby force oil into producing or recovery wells. Such producing wells are usually removed from the injection well, but techniques are also known for injecting and producing through a single well bore hole.

As will be apparent to those skilled in the art, the improved water-flooding process of the invention can be employed conjunctively with one or more other secondary recovery techniques. Illustratively, it may be desirable to employ a liquidified, hydrocarbon just ahead of the improved water drive of the invention as a miscible solvent.

The acrylic amide polymers to which the invention is applicable include the high molecular weight, homopolymers of acrylamide and methacrylamide and high molecular weight, water soluble copolymers of the foregoing with other suitable monoethylenically unsaturated monomers copolymerizable therewith. Such acrylic amide polymers are vinyl type polymers characterized by substantial linearity, i.e., having little or no cross-linking between polymer chains. They disperse in water to provide visually homogeneous and transparent solutions which can be diluted indefinitely. By "high molecular weight" is meant polymers having a molecular weight of at least about 100,000 and up to 10 million or more as determined from light scattering data. The advantages are most pronounced when the polymer has a molecular weight over one million. In other terms, the acrylic amide polymers useful herein have a molecular weight such that they are characterized by a viscosity of at least about 4 centipoises as a 0.5 percent by weight solution in distilled water adjusted to a pH of about 3 at a temperature of 25° C., the viscosity being determined with an Ostwald viscosimeter.

Specific examples of acrylic amide polymers in addition to the formentioned homopolymers, are water-soluble copolymers of acrylamide or methacrylamide with comonomers containing water solubilizing groups as for example acrylic acid, methacrylic acid, maleic acid, alkali metal salts of such acids, vinylbenzyl compounds (such as trimethylvinylbenzylammonium chloride), vinylbenzenesulfonic acid, 2-sulfoethyl acrylate, 2-aminoethylacrylate, N-vinyloxazolidone, N-vinylpyrrolidone, N-vinylmorpholinone and the like. In such copolymers, the comonomer may constitute up to about 50 mole percent of the finished polymer. Comonomers that are water insoluble may also be copolymerized with the amide monomers, but in such instances the amount should not exceed more than about 25 mole percent of the finished copolymer in order to maintain water solubility of the finished copolymer. Examples of such comonomers are methylvinyl ether, vinylacetate, styrene, methylacrylate, ethylacrylate, ethylene, vinyl chloride, vinylidene chloride and the like.

The following test operations illustrate the advantages of the conjoint use of mobility control agents of the specified type and aqueous ammonium hydroxide in a water drive medium. Sandstone cores in the form of cylinders 1-inch in diameter and 7½ inches long were mounted in a standard core-testing apparatus in which fluids could be forced lengthwise through the core. Each core was first flushed with a 3% by weight sodium chloride brine and then flooded to saturation with a crude oil having a viscosity of 70 centipoises. The oil-containing cores were again flooded with 25 ml. of the aqueous brine to displace the mobile oil. The oil remaining in the core at this point was assumed to be the "residual oil," A second flood was then carried out in the core containing just the residual oil and 25 ml. of a water solution containing 2% by weight of ammonium hydroxide, 0.05% by weight of a high molecular weight polyacrylamide, and, to simulate a natural brine, 6% by weight sodium chloride. This flood produced about 21% of the residual oil. The total residual oil was determined as the sum of the amount of the oil produced by the described second flood and in addition the amount of crude oil recovered by finally flushing the core with 25 milliliters of hexane.

To illustrate the uniqueness of the above result, an additional flood was carried out in a manner identical to that employed above, except that the ammonium hydroxide was omitted from the second flooding medium. This flood, containing the polymer only, produced only about 2% by weight of the residual oil.

In still another comparative run, using as the second flooding medium 25 milliliters of a solution containing 2% by weight ammonium hydroxide and 3% by weight sodium chloride, only 11% of the residual oil was produced.

In consideration of the above, it will be observed that the polymeric additive, while having essentially no effect on residual oil when employed alone, surprisingly increased, and in fact almost doubled the residual oil that could be obtained with the aqueous ammonium hydroxide.

What is claimed is:

1. A method for producing oil from a subterranean oil bearing formation having at least one injection well and one production well which comprises injecting an aqueous flooding medium composed of an aqueous brine having dissolved therein at least about 1 weight percent ammonium hydroxide and from about 0.01 up to about 0.5 percent by weight of an acrylic amide polymer into an injection well and recovering oil at the production well.

2. A method as in claim 1 wherein the acrylic amide polymer is a high molecular weight polyacrylamide.

3. A method as in claim 1 wherein from about 1 to about 30 percent of a pore volume of the flooding medium is injected and the flood front thus formed is driven on into the formation by the injection of a second fluid driving medium.

4. A method as in claim 1 wherein the aqueous brine has dissolved therein at least about 4 weight percent of ammonium hydroxide.

References Cited
UNITED STATES PATENTS

| | | | |
|---|---|---|---|
| 2,827,964 | 3/1958 | Sandiford et al. | 166—9 |
| 3,039,529 | 6/1962 | McKennon | 252—8.55 |
| 3,074,481 | 1/1963 | Habermann | 166—9 X |
| 3,087,539 | 4/1963 | Maurer | 166—9 |
| 3,208,518 | 9/1965 | Patton | 166—9 |
| 2,831,841 | 4/1958 | Jones | 260—89.7 |
| 2,892,823 | 6/1959 | Boettner et al. | 260—89.7 X |

ERNEST R. PURSER, *Primary Examiner.*

IAN A. CALVERT, *Assistant Examiner.*